(12) United States Patent
Hausler

(10) Patent No.: US 11,367,331 B2
(45) Date of Patent: Jun. 21, 2022

(54) MONITORING SYSTEM MOUNT

(71) Applicant: Graham Speier Hausler, Bend, OR (US)

(72) Inventor: Graham Speier Hausler, Bend, OR (US)

( * ) Notice: Subject to any disclaimer, the term of this patent is extended or adjusted under 35 U.S.C. 154(b) by 11 days.

(21) Appl. No.: 16/987,161

(22) Filed: Aug. 6, 2020

(65) Prior Publication Data

US 2022/0044534 A1 Feb. 10, 2022

Related U.S. Application Data

(60) Provisional application No. 62/884,074, filed on Aug. 7, 2019.

(51) Int. Cl.
*G08B 13/196* (2006.01)
*F16M 13/02* (2006.01)

(52) U.S. Cl.
CPC ..... *G08B 13/19632* (2013.01); *F16M 13/025* (2013.01); *F16M 13/027* (2013.01)

(58) Field of Classification Search
USPC .................................................. 348/370–374
See application file for complete search history.

(56) References Cited

U.S. PATENT DOCUMENTS

2014/0049636 A1\* 2/2014 O'Donnell ......... G08B 13/1966
348/143

\* cited by examiner

*Primary Examiner* — Yogesh K Aggarwal
(74) *Attorney, Agent, or Firm* — Mark S Hubert

(57) ABSTRACT

A mounting device for a monitoring sensor that can be affixed to any wall, or walls, or ceiling or ceilings or ceilings and walls, and can be affixed to any corner or any wall-ceiling interface regardless of the included angle. The invention has four different mounting assemblies for different mounting locations and different sizes of monitoring sensors. Each of the four mounting assemblies is available in a single orifice design and a multiple orifice design. Each embodiment shares the same attachment method of a ferromagnetic mounting plate to a magnetic mount, each with double faced adhesive tape on one of their faces. The mounting plates are affixed to the building structure with the double sided tape and the magnetic mount is affixed to the monitoring sensor with double sided tape.

8 Claims, 11 Drawing Sheets

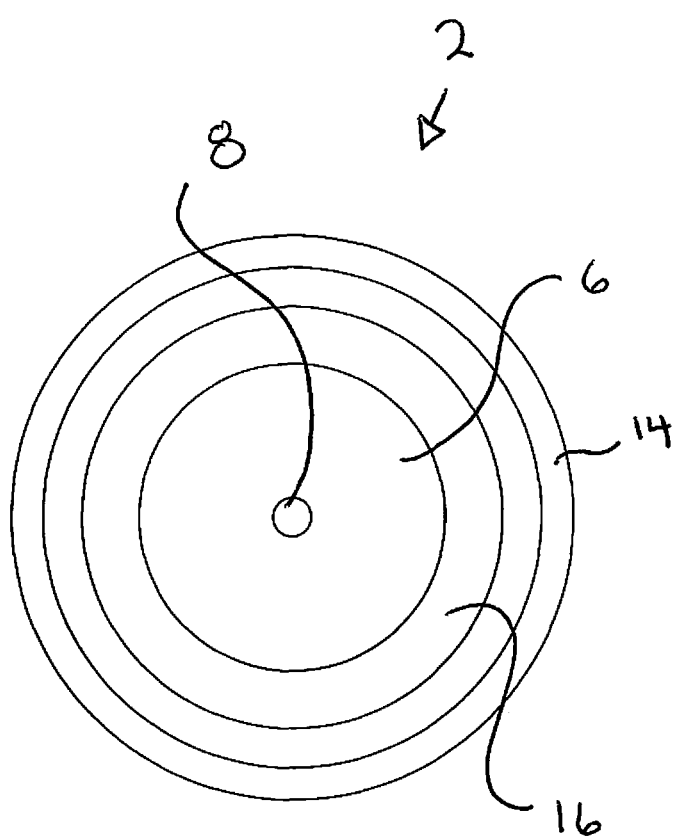
FIG. 1
FIG. 2

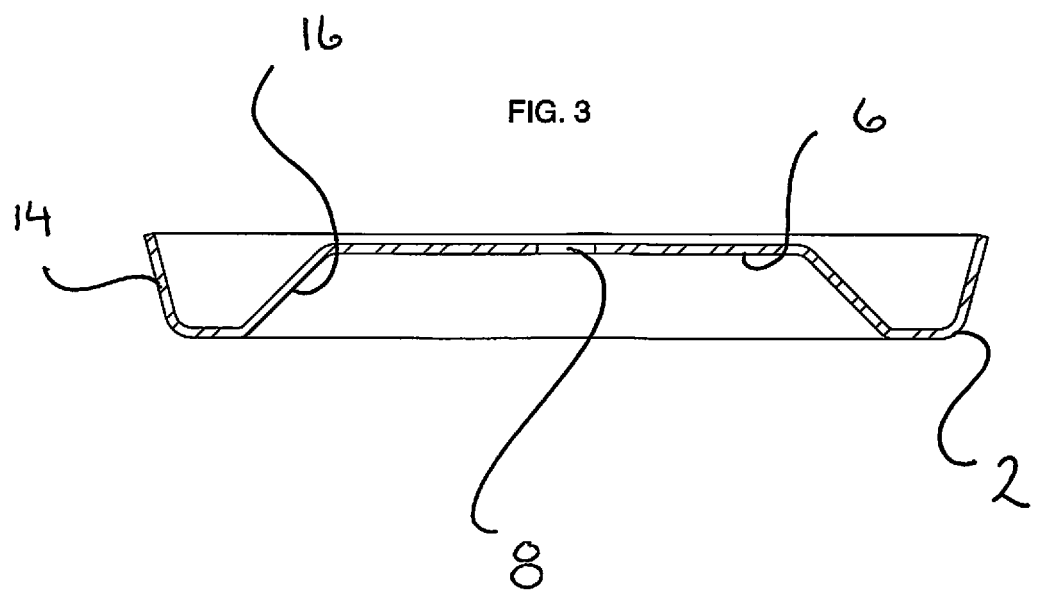

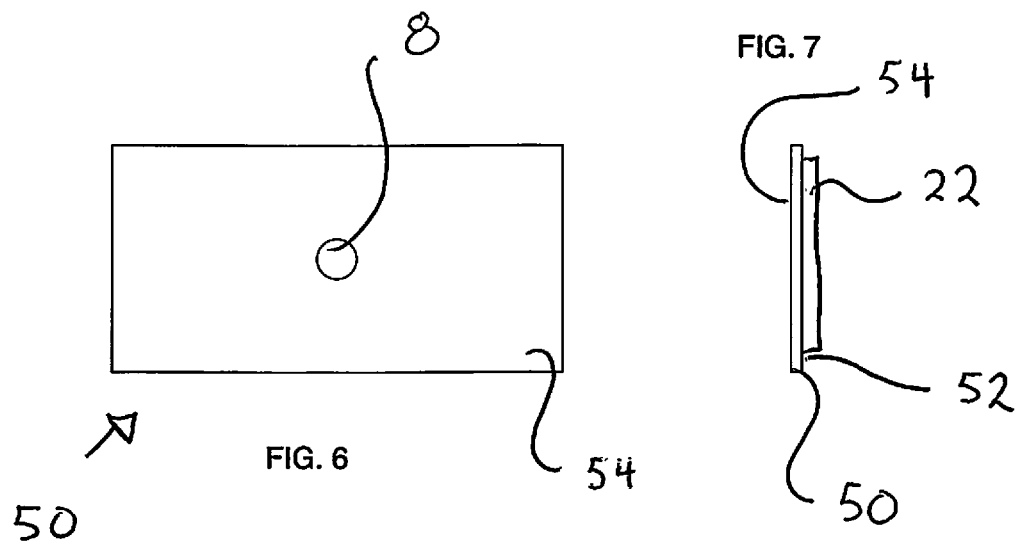

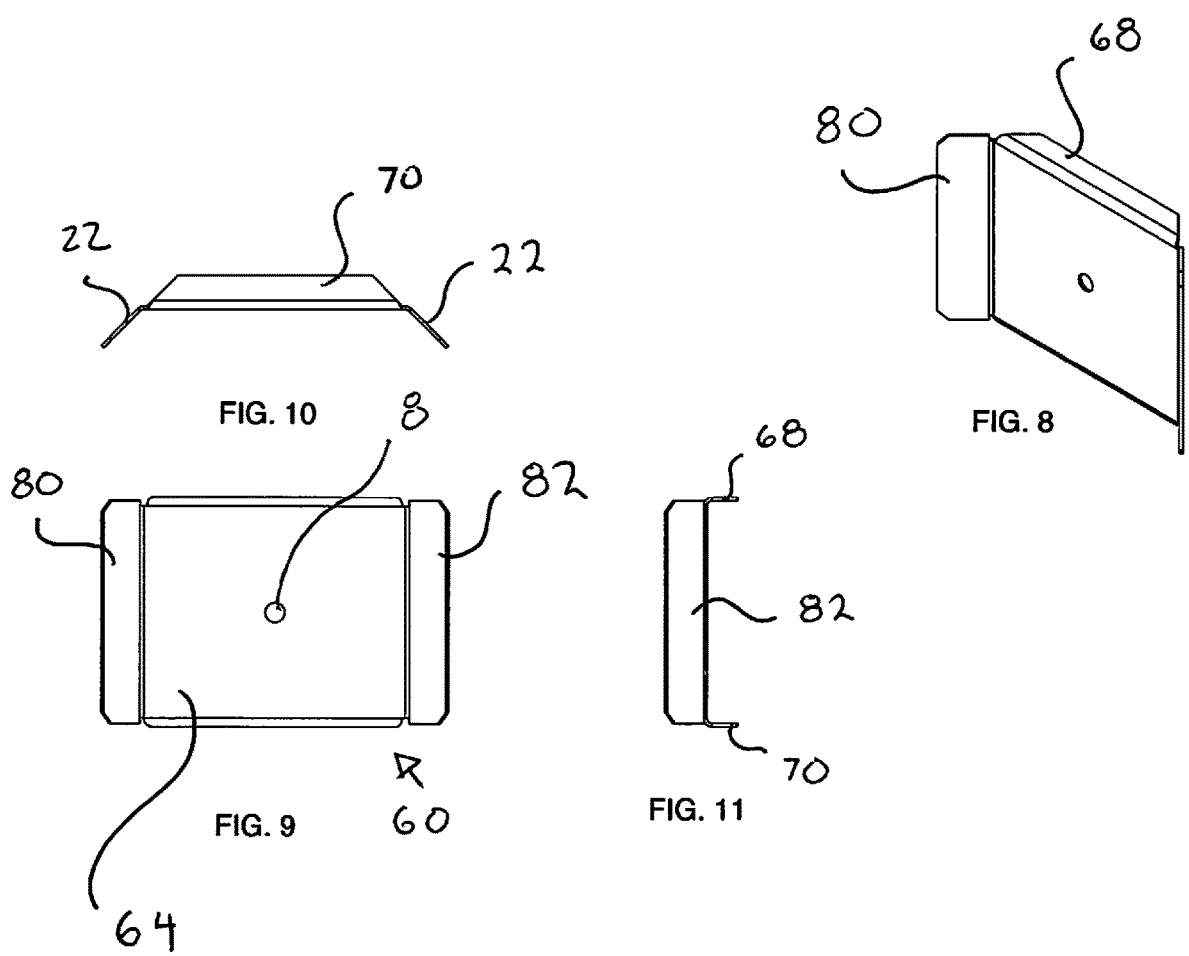

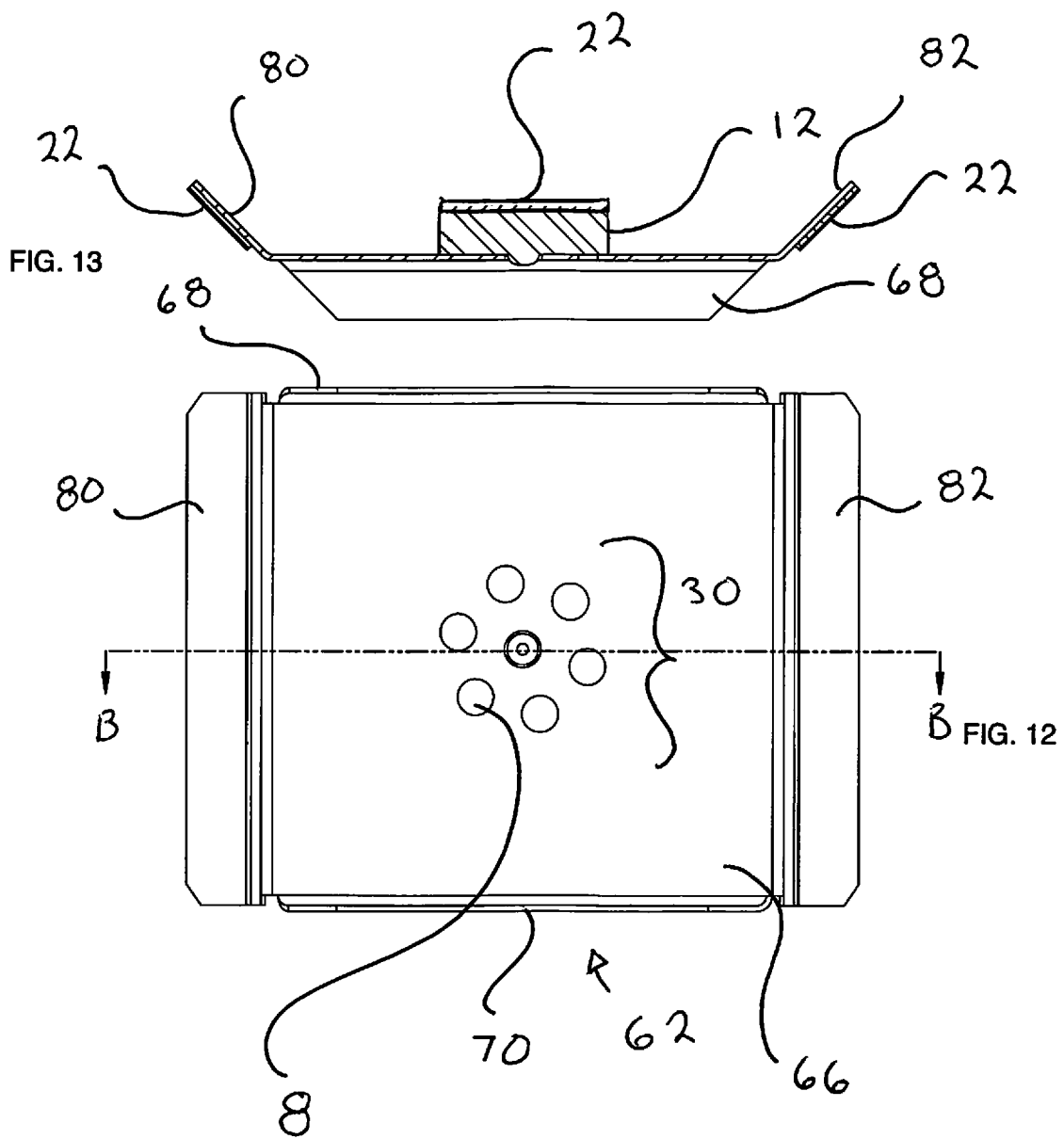

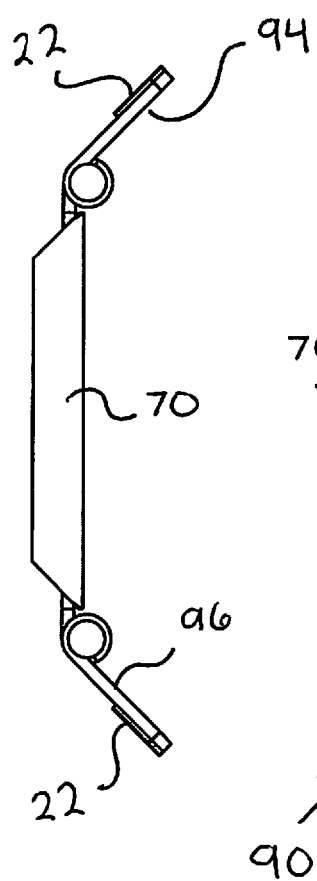
FIG. 15
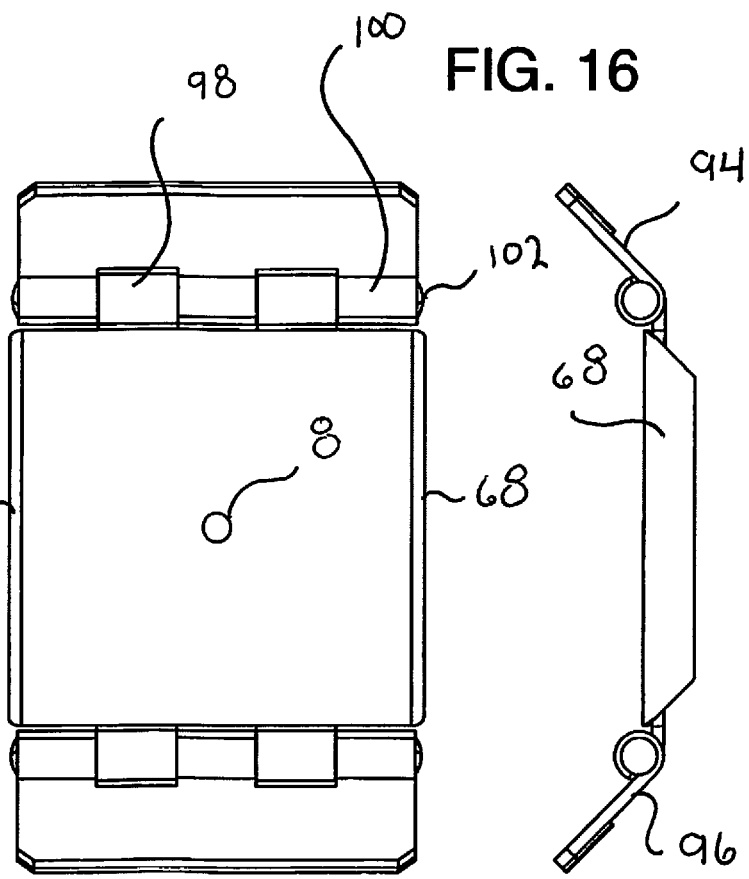
FIG. 16
FIG. 14

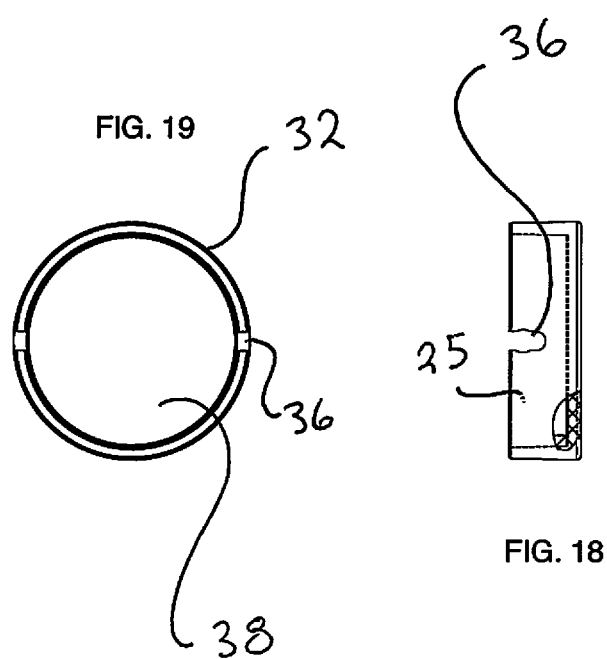

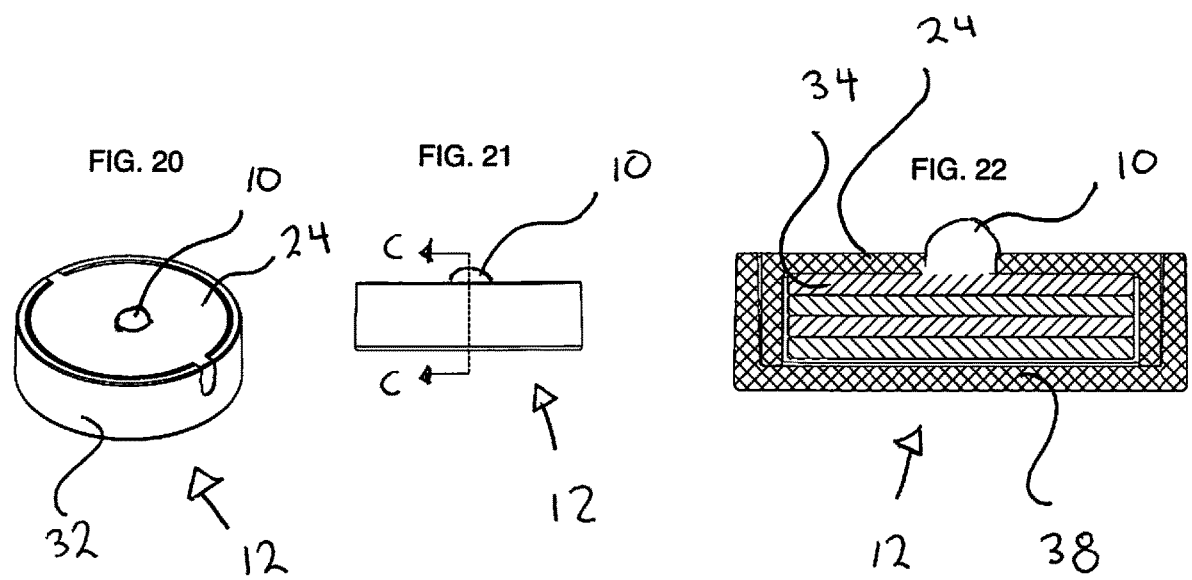

MONITORING SYSTEM MOUNT

PRIORITY

This application incorporates by reference, claims domestic priority from and is a continuation-in-part of US utility application Ser. No. 62/884,074 filed Aug. 7, 2019.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to do-it-yourself security monitoring systems, and more particularly to a universal wall and ceiling mounting system for the operational alarm sensors or detectors, microphones and cameras used in residential, commercial and industrial security monitoring systems.

BACKGROUND

A burglary takes place about every eighteen seconds in the United States which corresponds approximately 4,800 every day. The average property dollar loss per burglary is a staggering $2,251. U.S. fire departments respond to an average of one home fire every 86 seconds. The average fire damage repair is $13,500. Many municipalities have instituted building codes requiring CO and $CO_2$ alarms. For such reasons, the commercially monitored home security and safety business is booming.

The sophistication of electronic security and safety devices has increased dramatically over the last decade. Great strides have been made in the do it yourself security industry. The days of having the entire house wired to incorporate window and door sensors are gone with the advent of the newer electronic sensors. The future of home security is a fully integrated system of security, safety and communication accessible and controllable over the internet. However, no homeowner wants an unsightly electronic and wiring mess tacked up around their residence. Everyone wants a clean, aesthetically appealing mounting of their system components.

Unfortunately, to get such an installation previously has previously required a professional installer. This is offered by all home monitoring companies, but at a hefty price or given free with a term commitment to their monitoring services. However, with the new electronics and portable security/safety monitors the skill set to install the new devices has been lowered dramatically.

Henceforth, a simpler, system for the aesthetic mounting of the sensors for residential security/safety systems that any DIY homeowner could accomplish would fulfill a long felt need in the home monitoring industry. This new invention utilizes and combines known and new technologies in a unique and novel configuration to overcome the aforementioned problems and accomplish this.

BRIEF SUMMARY

In accordance with various embodiments, a monitoring system mounting device is provided.

In one aspect, a do-it-yourself (DIY) mounting system requiring no screws or bolts for affixation to a wall of ceiling, for a security/safety/communication sensor or camera.

In another aspect, a system adapted for the mounting of electronic components such as cameras, motion sensors, smoke detectors and the like on walls or ceilings.

A DIY mounting system for the adjustable affixation of electronic components in wall corners or on ceiling-wall interfaces respective of their included angles.

In yet another aspect, a self-adhesive mount for heavier surveillance sensors and components that allows for the adjustability of the mounted device upon the mount.

In yet another aspect, an adhesive DIY wall/ceiling mount adapted to allow the self-centering, adjustable magnetic coupling of an electronic component.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 1 is a top view of the single orifice ceiling mounting plate;

FIG. 2 is a side view of the single orifice ceiling mounting plate;

FIG. 3 is a side cross sectional view of the single orifice ceiling mounting plate;

FIG. 6 is a front view of the single orifice flat wall mounting plate;

FIG. 7 is a side view of the single orifice flat wall mounting plate;

FIGS. 8-11 are front perspective, front, top/bottom and right-side/left-side views of the single orifice corner mounting plate;

FIG. 12 is a front view of the multi orifice corner mounting plate showing section line B-B;

FIG. 13 is a cross sectional view of the multi orifice corner mounting plate taken through section line B-B of FIG. 12;

FIG. 14 is a front view of the single orifice universal mounting plate;

FIGS. 15 and 16 are top and bottom views of the single orifice universal mounting plate;

FIG. 18 is a side cross sectional view of a magnetic mount disk cup;

FIG. 19 is a top view of magnetic mount disk cup;

FIG. 20 is a front perspective view of the magnetic mount;

FIG. 21 is a side view of the magnetic mount showing section line 3-3;

FIG. 22 is a side perspective view of the magnetic mount taken through section line C-C of FIG. 21;

DETAILED DESCRIPTION OF CERTAIN EMBODIMENTS

Figure 5:
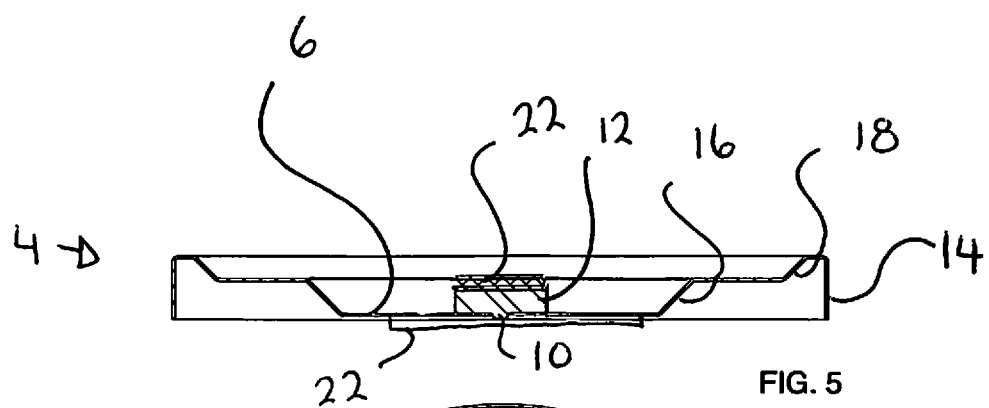
FIG. 5 is a cross sectional view of the multi orifice mounting plate through section A-A of FIG. 4.
Figure 4:
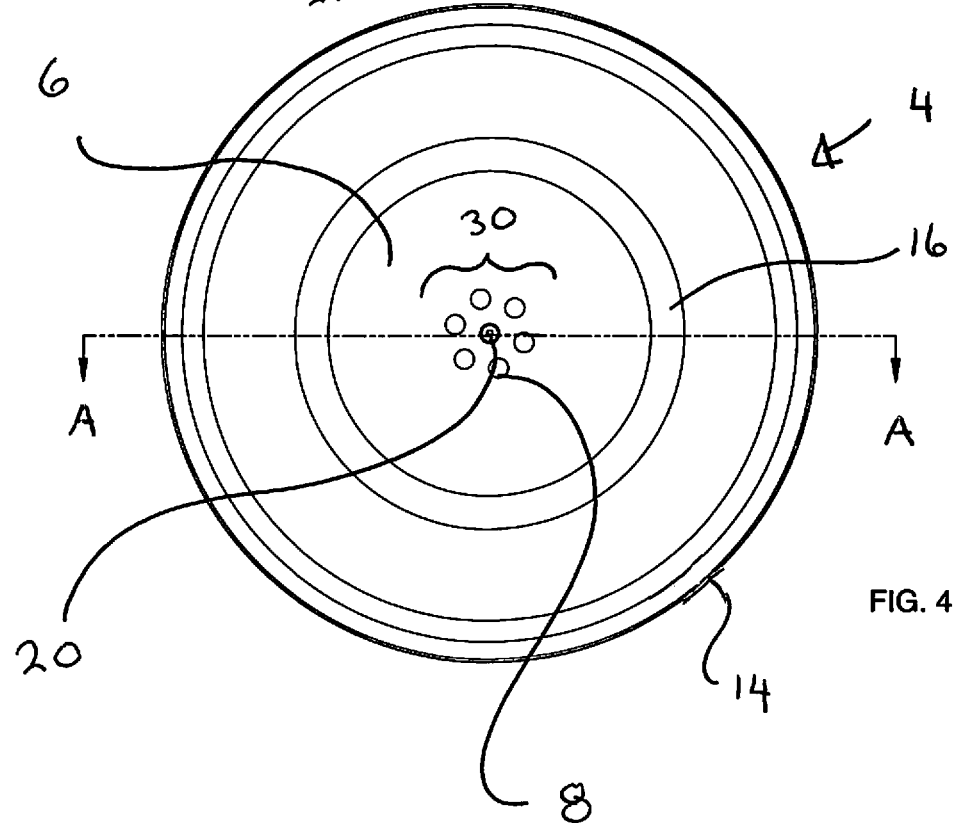
FIG. 4 is a front view of the multi orifice ceiling mounting plate showing sectional line A-A.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first magnet could be termed a second magnet, and, similarly, a second magnet could be termed a first magnet, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, the term "monitoring sensor" refers to an electronic device or combination of electronic devices used for detecting and reporting anomalies such as smoke, gases, heat, fire, motion, light, water, moisture, temperature excesses, glass breaking, sound, vibration, live video feed, and the like, in a building and that reports these anomalies. This reporting can be in the form of audio or visual alarms, emails, text messages or remote signals sent locally or offsite to a reporting station. It includes all of their operational electronic components including but not limited to microprocessors, batteries, cellular network modules, wireless transceivers, mesh network modules, cellular transmitters and video modules.

As used herein, the term "adhesive means" refers to any method of adhesion used to bond two surfaces together including but not limited to double-sided tape, hook and loop fasteners, glue, epoxy, mastic, adhesive caulk, adhesive gel or dry adhesive putties.

The present invention relates to a novel design for a mounting device for a monitoring sensor that can be affixed to any wall, or walls, or ceiling or ceilings or ceilings and walls, and can be affixed to any corner or any wall-ceiling interface regardless of the included angle. The invention has four different mounting assemblies for different mounting locations and different sizes of monitoring sensors. Each of the four mounting assemblies is available in a single orifice design and a multiple orifice design. Each embodiment has a planar central region or face and shares the same attachment method of a ferro-magnetic mounting plate and a magnetic mount, each that has double faced adhesive tape on one of their faces. The mounting plates are affixed to the building structure with the adhesive means (preferably adhesive tape) and the magnetic mount is affixed to the monitoring sensor with adhesive tape. The mounting plates are made of ferro-magnetic metal and once attached to the building may have a magnetic mount with its attached sensor magnetically affixed centrally thereto. The mounting plates although having eight different physical configurations based on where they are to be affixed, (wall, ceiling or corner) and what they are to be affixed to, all share the identical magnetic mount's alignment and adjustment design and method of affixation to the building.

Looking at FIGS. 1-5 the single orifice ceiling mounting plate 2 and multi orifice ceiling mounting plate 4 can best be seen and explained. It can be seen that these ceiling mounting plates 2 and 4 in their preferred embodiments are thin ferromagnetic steel disks with a generally planar, dished or depressed central circular mounting face 6 having at least one circular orifice 8, (as in the single orifice embodiment 2) or an array 30 of circular orifices 8, (as in the multi-orifice embodiment 4) where each orifice 8 is sized for mating engagement with the alignment button 10 of the magnetic mount 12. (FIGS. 20-22) The ceiling mounting plates 2 and 4 are made of thin gauge metal approximately 0.034 inches thick in the preferred embodiment, and as such requires an outer stiffening flange 14 (at the outer perimeter of the plates) and at least one inner stiffening ring 16 to retain their planar configurations when loaded with a monitoring sensor. In the multi orifice embodiment there is a second, intermediate stiffening ring 18 as well. (This is helpful to prevent distortion from the planar configuration when heavier sensor are used.) The outer stiffening flanges 14 reside perpendicular to the plane of the central mounting face 6.

As with all of the single orifice mounting plates, the single orifice 8 is centrally located on the planar mounting face 6. As with all the multi orifice mounting plates the array of mounting orifices 8 has a central mounting orifice 20 centrally located on the planar mounting face 6 which the remaining mounting orifices 8 are radially evenly spaced around. As can be seen in FIG. 5 there is an adhesive means which here in the preferred embodiment is a section of double-sided adhesive tape 22 affixed to the back side of the central mounting face 6 that is used to attach the ceiling mounting plate 2 or 4 to the ceiling. There is also a second section of double-faced adhesive tape 22 affixed to the cap of the magnetic mount 12. This is used to affix the sensor to the magnetic mount 12. The magnetic mount 12 has a circular dome shaped button 10 centered on its cap 24 (FIGS. 20-22) that frictionally engages any of the orifices 8 in the ceiling mount plate 2 or 4.

It is to be noted, that for aesthetic purposes the central mounting plate 6 is not coplanar with the rear edge of the outer stiffening flange 14, but rather sits above the plane of the other edge of the outer stiffening flange 14 by at least the approximate thickness of the double-sided adhesive tape 22. In this fashion the outer stiffening flange will sit flush to the ceiling without any visible gaps. A monitoring sensor, when attached to the double-sided tape 22 on the magnetic mount 12, will reside within the plane of the outer stiffening flange 14. This will make a visually appealing mounting of any monitoring sensor as its back plate will be recessed in the planar mounting plate.

The array 30 of orifices 8 allows slight changes in the placement of the sensor on a particular mounting plate. This is useful when the sensor is irregularly shaped or as in the case of a camera, requires positioning to one side of another when it encounters a physical interference with the sides of the stiffening rings.

Looking at FIGS. 18-25 the magnetic mount 12 can best be explained. The magnetic mount 12 is made of a ferromagnetic concave mount cup 32, a mount cap 24 and at least one magnet 34, preferably a cylindrical stack of multiple rare earth magnets. The mount cup 32 is a circular cylindrical concave cup having a bottom plate 38 and a circular side wall 25 that has a pair of cap lock detents 36 cut into its side, 180 radial degrees apart. The cap lock detents 36 are conformed for mating engagement with side tabs 40 that extend perpendicularly from the side edge of the mount cap 24. The mount cap 24 is a circular cylinder also that has a planar top face 42 and a circular side wall 44 that defines an internal concavity sized to hold at least one circular magnet 34, preferably though, a stack of identical circular rare earth magnets 34. It also has a circular dome shaped button 10 centered on the outer side of the top face 42. This button 10 frictionally engages any of the orifices 8 in the ceiling mount plate 2 or 4. The button ensures that the mount is centered in the mounting plate by using either the single orifice of the central orifice in the array of orifices 30. The base dimeter of the button 10 approximates the diameter of the orifices 8, which in the preferred embodiment is 0.215 inches. The diameter of the button 10 is slightly less than the diameter of the orifice 8 such that when the parts are joined the button side wall will contact the side wall of the orifice 8.

The exterior diameter of the circular side wall 44 is sized for frictional engagement within the concave mount cup 32. The entire magnetic mount is held together by three things: the magnetism between the magnet array and the ferromagnetic parts; the frictional engagement of the side tabs 40 of the mount cap 24 and the cap locks 36 of the mount cup 32; and the frictional engagement between the circular side wall 44 of the mount cap 24 and the inside of the concave mount cup 32. The assembled magnetic mount 12 holds the sensor in or on any of the various 8 plates discussed herein.

The remainder of the drawings reflect other, alternate embodiments of mounting plates to be used in specific locations about the building. Often corner placement is best for camera or motion sensors while ceiling placement is better for smoke detectors and walls are a better placement for glass breakage sensors.

FIGS. 6-7 show a flat wall mounting plate 50. It is a ferromagnetic rectangular, planar plate with a central orifice 8 formed therethrough and a section of double-sided tape 22 on its rear face. It is utilized the same as all the other mounting plates. It has a front face 54 to which a magnetic mount 12 with its attached sensor is magnetically coupled with the magnetic mount's button 10 matingly engaged within the central orifice 8, and it is affixed to a building surface (generally a wall) by a section of double-sided tape 22 that is also affixed to the rear face 52.

FIGS. 8-11 illustrate the single orifice corner mounting plate 60 while FIGS. 12 and 13 illustrate the multi orifice corner mounting plate 62. These are distinguished only by their number of orifices 8. The corner mounting plates 60 and 62 in their preferred embodiments are thin ferromagnetic steel plates with a generally planar, rectangular, central face 64 and 66 having either a single round orifice 8 or an array 30 of substantially similar round orifices 8, where each orifice 8 is sized for mating engagement with the alignment button 10 of the magnetic mount disk 12. (FIGS. 20-22) The corner mounting plates 60 and 62 are made of thin gauge metal approximately 0.034 inches thick in the preferred embodiment, and as such requires a top linear stiffening flange 68 and bottom linear stiffening flange 70 to retain is planar configuration when loaded with a monitoring sensor. These two linear stiffening flanges 68 and 70 project towards the rear normally (at approximately 90 degrees from the plane of the central faces 64 and 66 from the top and bottom edges of the front face of the corner mounting plates 60 and 62. On each of the right and left side edges of the of the central faces 64 and 66 of the corner mounting plates 60 and 62, projecting at approximately 45 degrees from the planes of these central faces, are the left mounting flange 80 and the right mounting flange 82. In combination, these two mounting flanges will abut adjacent 90-degree walls at their corners and allow for the central faces 64 and 66 to face the central region of the room. On the rear face of both of the right and left mounting flanges 60 and 62 are sections of double-sided adhesive tape 22. (These corner mounting plates 60 and 62 may also be use at any 90-degree wall-ceiling corner.) Here again, these mounting plates are utilized identically as the aforementioned mounting plates with the exception of where they are to be mounted. FIG. 13 is representative of the magnetic mount 12 a section of double-sided adhesive tape 22 affixed to the magnetic mount's front face.

Figure 17:
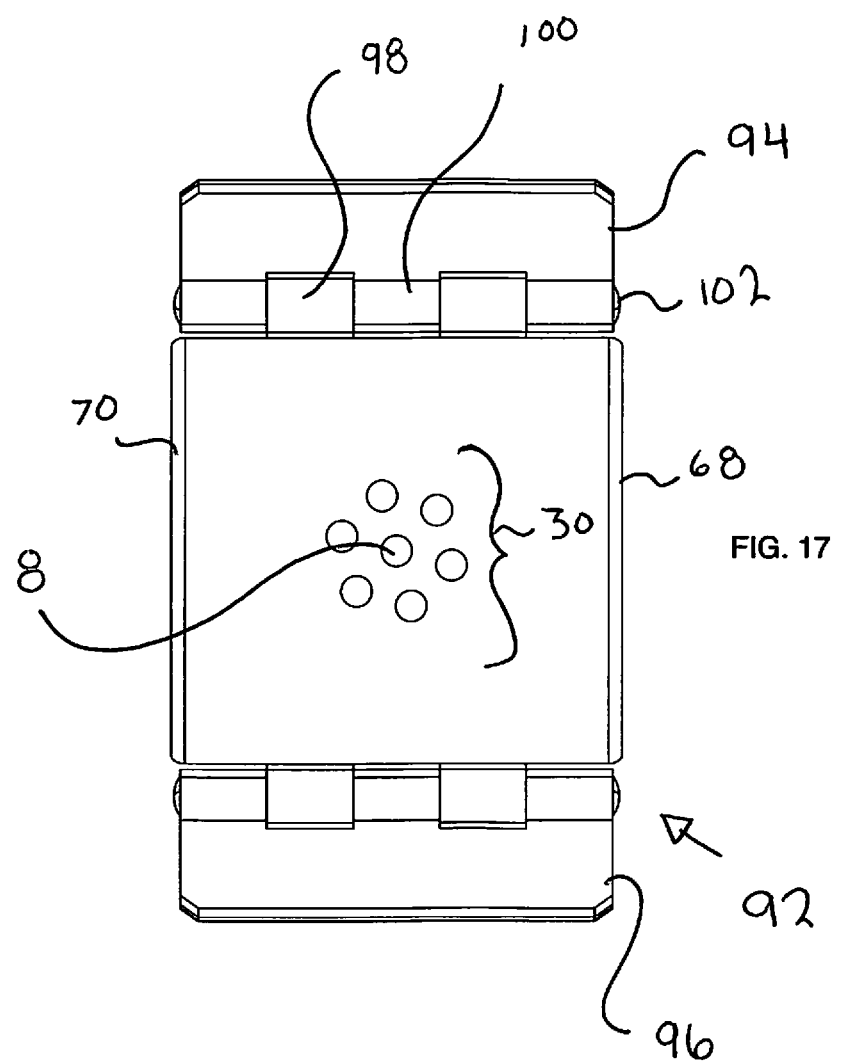
FIG. 17 is a front view of a front view of a multi orifice universal mounting plate.
Figure 23:
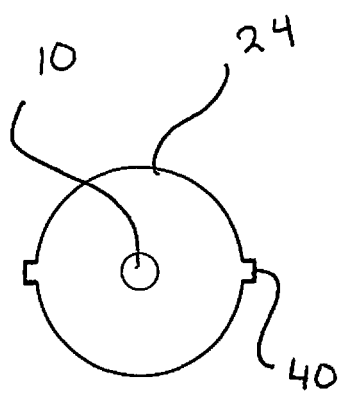
FIG. 23 is a top view of the magnetic mount cap.
Figure 24:
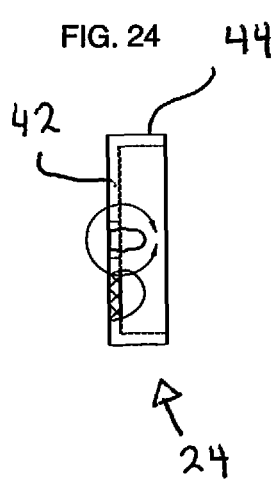
FIG. 24 is a side view of the magnetic mount cap showing circular section.
Figure 25:
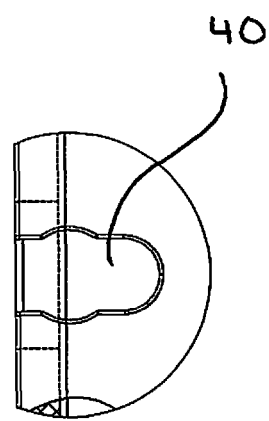
FIG. 25 is a side view of the flat mounting plate showing a section circle.

FIGS. 14-16 illustrate the single orifice universal mounting plate 90 while FIG. 17 depicts the multi orifice universal mounting plate 92. These two embodiments differ from each other only in the number of orifices formed through therethrough. These universal mounting plates 90 and 92 are corner mounting plates that do not have fixed angle right and left mounting flanges, rather they have hinged right and left mounting flanges 94 and 96 hingedly mounted at their right and left sides. As in the corner mounting plates 60 and 62, these universal mounting plates 90 and 92 have sections of double-sided adhesive tape 22 on the rear faces of their mounting flanges 94 and 96 as well as a linear top stiffening flange 68 and linear bottom stiffening flange 70.

As is well known in the art, the hinged right mounting flange 94 and hinged left mounting flange 96 are coupled to the main bodies of the universal mounting plates 90 and 92 by the formation of a set of first hinge leaves 98 that extends normally from the side edges of the main body of these mounting plates to interleave with a set of second hinge leaves 100 that extend normally from the side edge of the right and left mounting flanges 94 and 96. The set of first hinge leaves 98 and set of second hinge leaves 100 are connected along their linear axes by hinge pins 102 so as to allow the pivoting of the mounting plates about the hinge pins to accommodate the mounting of these universal mounting plates to a plethora of adjacent walls and even into spaces where the walls are not adjacent. In this way the universal corner mounting plates can be secured to wall—wall and ceiling—wall interfaces with other than 90-degree interfaces.

The hinged left mounting flanges 96 and hinged right mounting flange 94 may be hinged in a plethora of different hinge styles however the preferred embodiment utilizes a conventional leaf or piano hinge. Essentially, the hinged left mounting flange 96 and hinged right mounting flange 94 resemble the left mounting flange 82 and the right mounting flange 80 of the corner mounting plates with the exception of planar tabs that extend from their inner edges. It is envisioned that the first hinge leaves will be formed with 360-degree bends in these tabs. The second hinge leaves on the front face of the universal corner mounting plates are fabricated in a similar fashion.

The novelty of the present invention resides in its ability to be quickly affixed by any non-professional installer to any flat surface, in a centered, spaced configuration at any 90-degree corner, or in a centered spaced configuration at any angled wall—wall or wall—ceiling interface. The precise mounting of the monitoring sensor on any of the mounting plates may be accommodated by movement of the magnetic mount disk's button into the central orifice or any of the orifices in the orifice array on the mounting plates. In this way, the monitoring sensor may be rotated upon installation to direct any of its specific functional components into a preferred position. Once in place, the monitoring sensor can be removed for battery replacement, repair or alignment of one of its visual components with a simple tug of enough force to separate the rare earth magnet form its ferromagnetic mounting plate.

While certain features and aspects have been described with respect to exemplary embodiments, one skilled in the art will recognize that numerous modifications are possible. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

Having thus described the invention, what is claimed as new and desired to be secured by Letters Patent is as follows:

1. A mount for a security or safety monitoring system comprising:
    a ferromagnetic mounting plate having a central planar region thereon and at least one orifice formed centrally therethrough said central planar region;
    a first adhesive means affixed to said ferromagnetic mounting plate;
    a ferromagnetic concave mount cup;
    a mount cap sized for mating engagement with, and residing within said ferromagnetic concave mount cup, said ferromagnetic mount cap having a first planar face with a domed button centrally located thereon, and a second planar face, said domed button sized for mating engagement within said at least one orifice;
    a second adhesive means affixed thereon said mount cup; and
    at least one magnet within said mount cap.

2. The mount for a security or safety monitoring system of claim 1, wherein said first adhesive means and said second adhesive means are sections of double-sided adhesive tape.

3. The mount for a security or safety monitoring system of claim 2,
    wherein said ferromagnetic concave mount cup is a hollow cylinder with a bottom plate affixed to a first circular side wall and wherein said first circular side wall has at least one cap lock detent formed into said side; and
    wherein said mount cap is a hollow cylinder with a planar top plate and a second circular side wall extending therefrom, said second circular side wall having at least one side tab formed thereon that frictionally engages said at least one cap lock detent to connect said mount cap to said mount cup.

4. The mount for a security or safety monitoring system of claim 3 wherein said at least one cap lock detent is two cap lock detents spaced 180 radial degrees apart, and wherein said at least one side tab is two side tabs spaced 180 radial degrees apart.

5. The mount for a security or safety monitoring system of claim 4 wherein said ferromagnetic mounting plate is a planar rectangular plate.

6. The mount for a security or safety monitoring system of claim 4 wherein said ferromagnetic mounting plate is a ferromagnetic disk with a generally planar, dished or depressed central circular mounting face and an outer circular stiffening flange formed about the outer perimeter of said ferromagnetic disk and at least one inner stiffening ring located between said circular mounting face and said circular stiffening flange.

7. The mount for a security or safety monitoring system of claim 4 wherein said ferromagnetic mounting plate is a rectangular plate with a planar top face, said rectangular plate having a linear top stiffening flange and a linear bottom stiffening flange that extend normally from said rectangular plate, and a left mounting flange and a right mounting flange that extend at approximately 45 degrees from a plane of said planar top face, and wherein said second adhesive means is affixed to said left mounting flange and said right mounting flange.

8. The mount for a security or safety monitoring system of claim 7 wherein said left mounting flange and said right mounting flange are hingedly connected to said ferromagnetic mounting plate.

\* \* \* \* \*